C. MOWRY.
POTATO HARVESTER.
APPLICATION FILED NOV. 2, 1910.
1,018,071.
Patented Feb. 20, 1912.
5 SHEETS—SHEET 1.
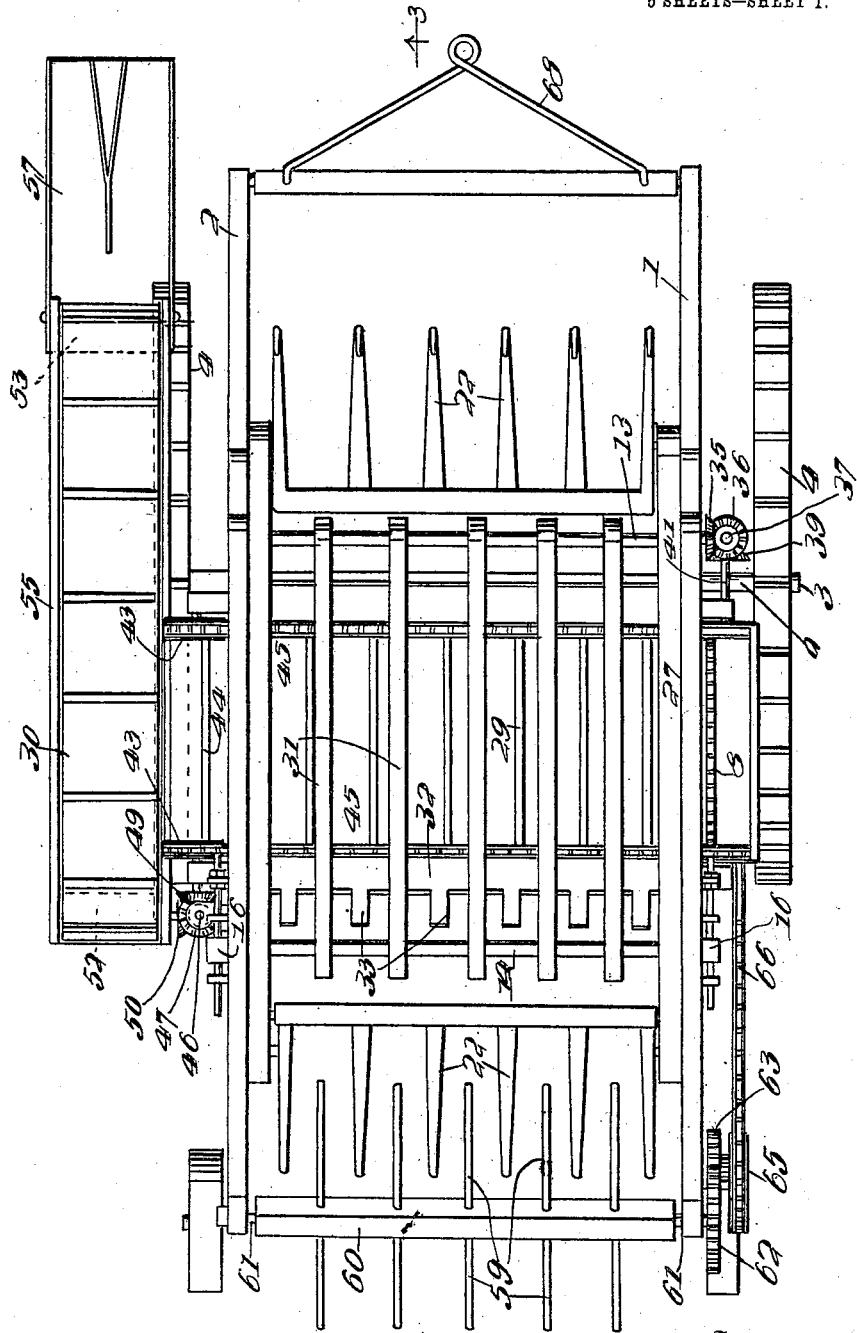
Witnesses
E. D. B. Brown.
M. E. Connor
Inventor
Charles Mowry
by J. H. Dunlap
Attorney

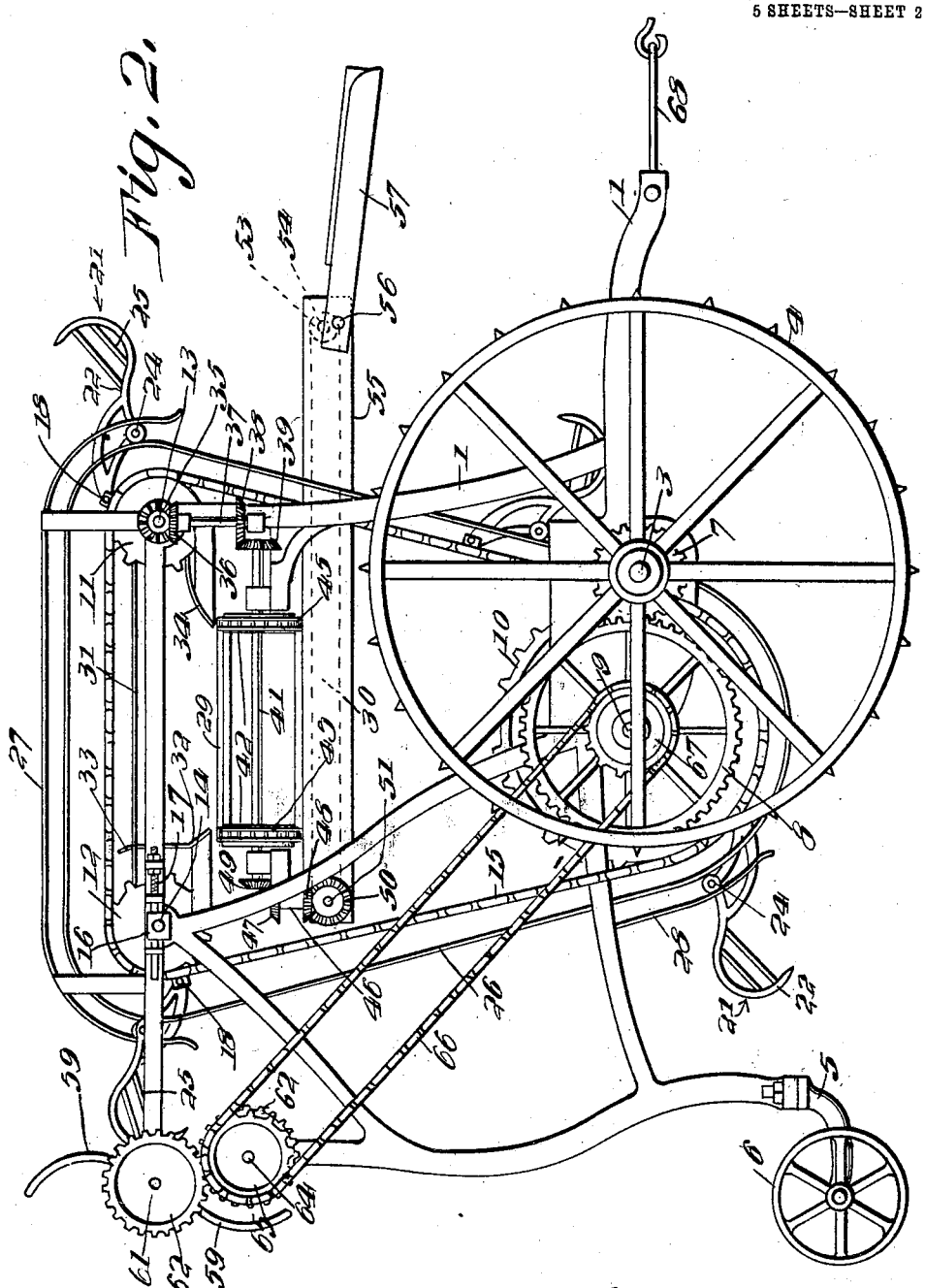

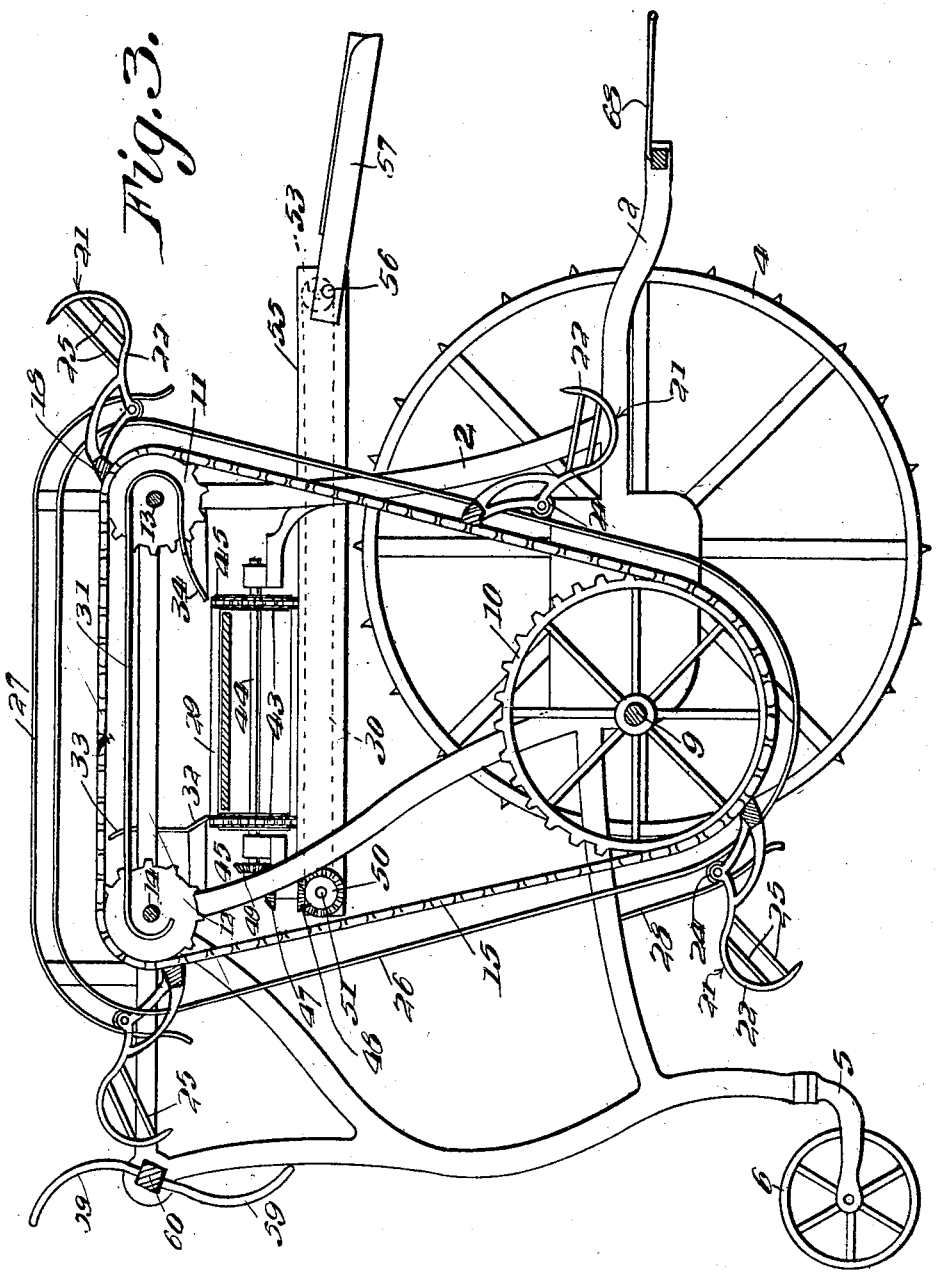

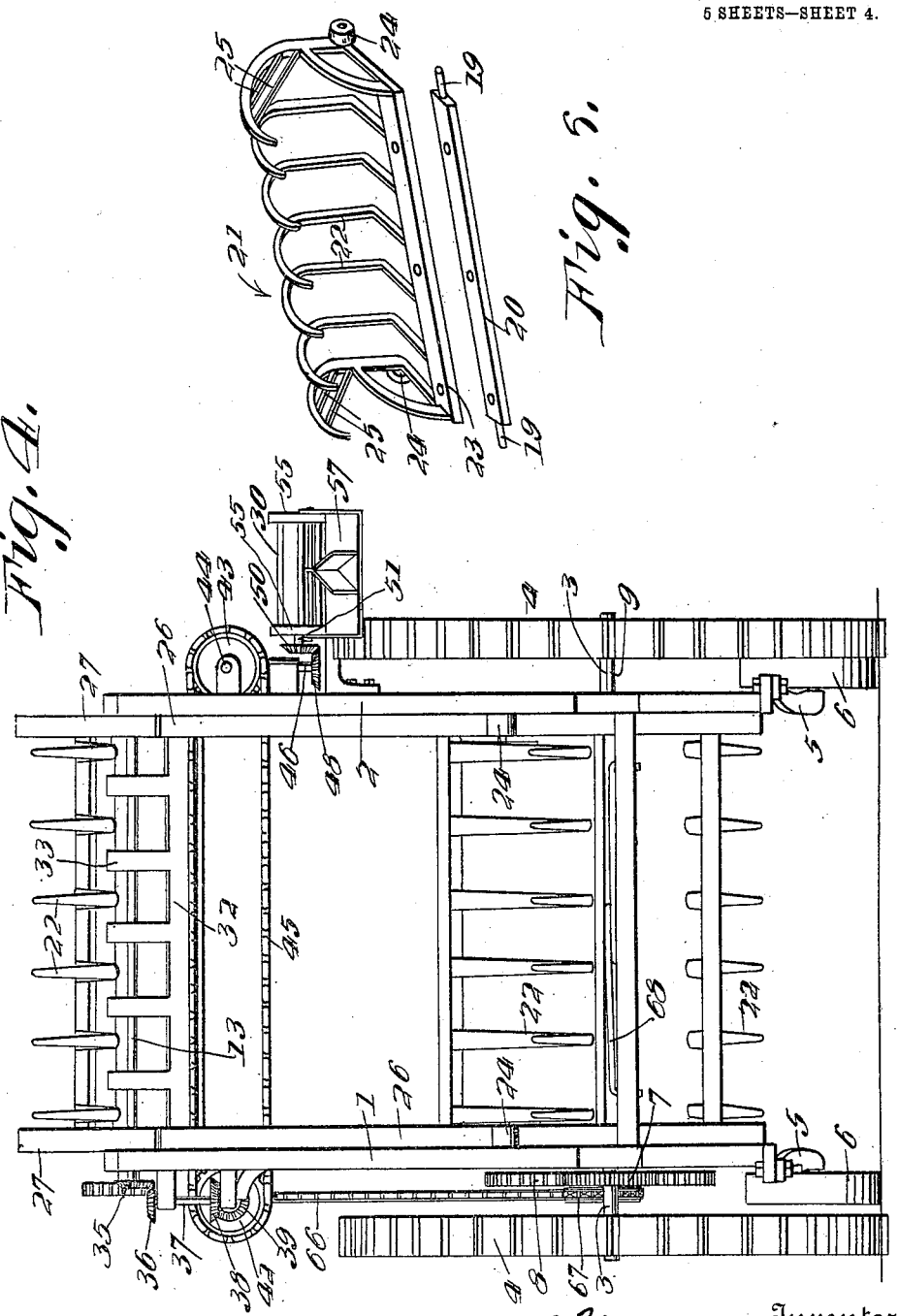

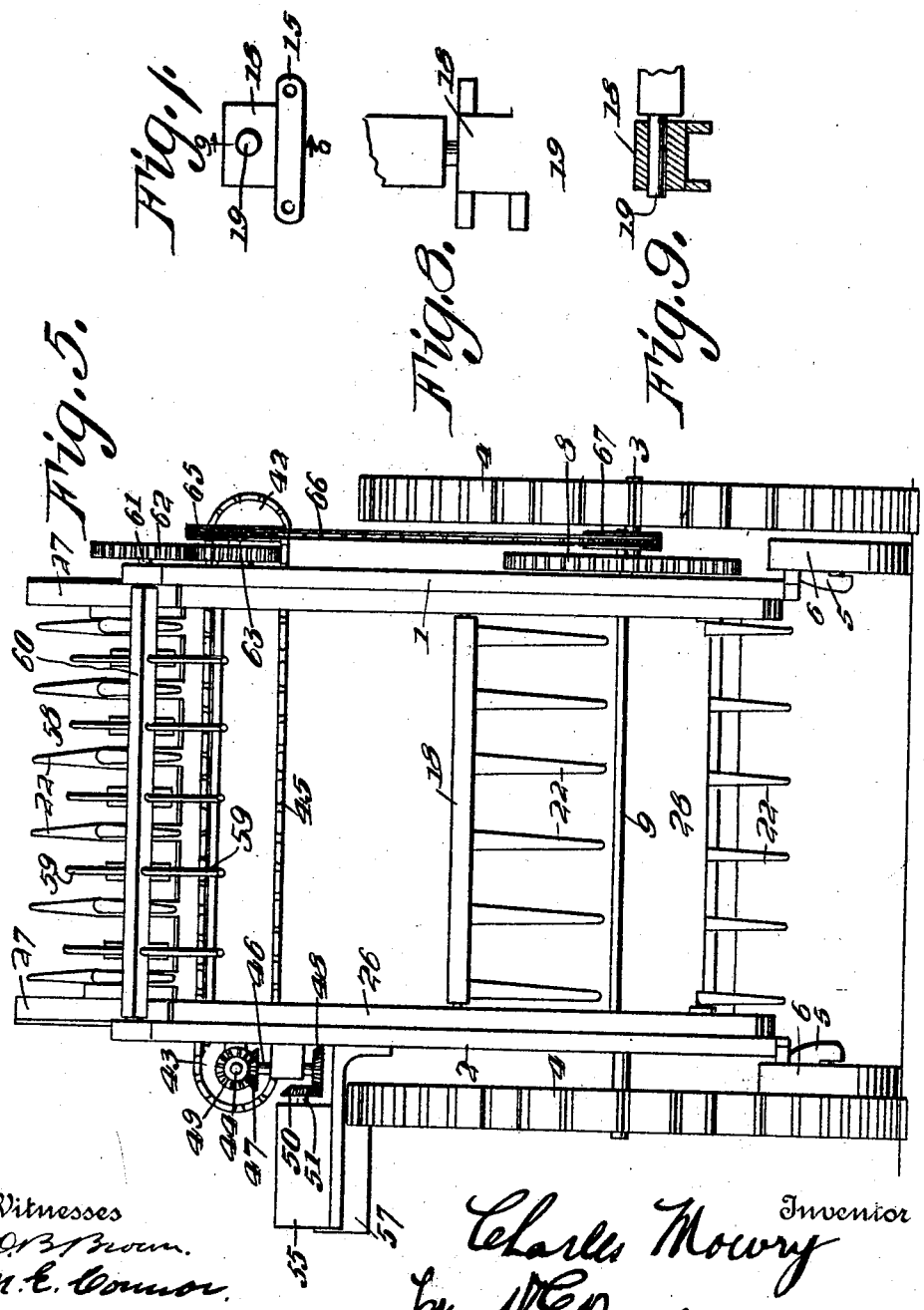

UNITED STATES PATENT OFFICE.

CHARLES MOWRY, OF KIMBALL, OHIO.

POTATO-HARVESTER.

1,018,071.  Specification of Letters Patent.  Patented Feb. 20, 1912.

Application filed November 2, 1910. Serial No. 590,396.

*To all whom it may concern:*

Be it known that I, CHARLES MOWRY, a citizen of the United States of America, and resident of Kimball, Erie county, State of Ohio, have invented certain new and useful Improvements in Potato-Harvesters, of which the following is a specification.

The present invention has reference to improvements in potato harvesters, and it comprehends, generally, the production of an extremely simple and effective machine of the class specified adapted to straddle a row of plants and to automatically remove the potatoes from the soil during its passage along the row, and deposit them in the wagon to which it is attached.

A structural embodiment of the invention is illustrated in the accompanying drawings, wherein:

Figure 1 is a plan view of the improved machine, Fig. 2 is a side elevation, Fig. 3 is a longitudinal vertical section taken on the line 3—3 of Fig. 1, Figs. 4 and 5 are front and rear elevations, Fig. 6 is a perspective view of one of the rakes, showing the component parts thereof separated, Fig. 7 is an end elevation of a slightly modified form of rake, Fig. 8 is a fragmental plan view of Fig. 7, and Fig. 9 is a detail sectional view taken on the line 9—9 of Fig. 7.

The various working elements, hereinafter described, are arranged in the main frame of the machine which comprises a pair of counterpart skeleton sides 1 and 2 of suitable construction. These sides are provided at their lower front ends with trunnions 3, whereon the traction wheels 4 are mounted, and have attached to their lower rear ends arms 5 which carry the rear wheels 6. To the hub of one of the traction wheels there is rigidly secured a pinion 7 which meshes with a gear 8 on a transverse shaft 9 journaled in the frame sides. This shaft carries in turn a pair of relatively large sprockets 10 around each of which and a pair of smaller sprockets 11 and 12 secured to front and rear transverse shafts 13 and 14 mounted in the upper portions of said sides, there passes one of the main chains 15 of the machine, the shaft 14 having its ends mounted in adjustable boxes 16 operated by threaded bolts 17 or the like to take up the slack in said chains. Said chains are provided at equidistant intervals with bearing blocks 18 which loosely receive the trunnioned ends 19 of the rakes.

In the preferred form, the rakes are composed of two separable parts, viz. a plate-like support 20, on which the trunnions 19 above referred to are provided, and a body portion 21 comprising a series of tines 22 and a plate 23 connecting the inner ends of the same, the tines and plate being integral with each other. The two plates 20 and 23 are adapted to be bolted or otherwise fastened together. The construction just described may, however, be modified by forming the entire rake as a single casting, as shown in Figs. 7 to 9, in which case the supporting plate and body plate are, of course, integral. The tines 22 have the same form in both constructions, and are substantially hook-shaped, their bills or working portions being curved and pointed, so as to take into the ground when the chains are in motion. The two end tines are each provided with a roller 24 arranged on the outer side face thereof adjacent the point where the bill and stem portions meet, and with a series of cross-pieces 25 connecting said portions, said cross-pieces serving to retain the potatoes on the rakes until the elevator referred to hereinafter is reached.

Owing to the loose fit of the trunnions 19 in the bearings 18, the rakes are to all intents pivoted to the chains, and means must therefore be provided for holding said rakes in operative position during certain portions of their travel. Such means preferably comprise a pair of tracks consisting each of a continuous main rail 26, which conforms to the shape of one of the chains, and top and bottom supplemental rails 27 and 28. These tracks are engaged by the rollers 24 on the rakes, which rollers normally travel along the main rails 26 and pass between the latter and the supplemental rails 27 and 28.

As shown in Figs. 2 and 3, the chains 15 and consequently the main track rails present an inverted triangular appearance. The ends of the upper supplemental rails are curved downwardly around the upper corners of the main rails, while the lower or bottom supplemental rails are arranged opposite the lower ends of the left-hand side members of the main rails. The carrier chains for the rakes are driven in a counter-clockwise direction, and at a comparatively slow speed owing to the proportional sizes of the gears 7 and 8 and of the latter and the sprockets 10 around which the chains pass. It will also be observed from Figs. 2 and 3 that the distance between the right-hand side members of the main rails and the right-hand stretches of the chains is appreciably less than that between said chains and the top members of the rails, the distance increasing gradually as the side members of the rails merge into the top members. With respect to the left-hand rail sides and chain stretches, it will be noted that the distance between the same gradually decreases from the upper to the lower ends thereof. It is due to these variations in the distances between the rail members and chains that the rakes are caused to change their positions during their travel. On traveling around the lower ends of the main rails, the teeth or tires of the rakes extend forwardly and toward the ground, so as to enable them to gather up the potatoes, which latter lie on or close to the surface of the ground and are more or less exposed, owing to their being turned up by the plow or other implement which has been previously drawn along the rows of vines. After gathering up the potatoes, the rakes carry the same, together with parts of the vines, upward toward the front sprockets 11, during which time the bills of the tines project upward, as shown in Figs. 2 and 3, the rakes being held from swinging inward and spilling the potatoes by reason of the fact that their rollers 24 bear against the adjacent side members of the main rails. On passing around said sprockets 11, the rollers enter and travel between the main and top supplemental rails, and the rakes are gradually elevated and inverted, depositing the potatoes upon the transverse conveyer 29, whence they are carried to a longitudinal conveyer 30 and finally transferred to the wagon, (not shown), which travels in front of the machine and effects its propulsion.

It will be understood that when the forks gather up the potatoes, they will also gather up branches and leaves of the vines, this being particularly the case when the potatoes have not been stripped from the vines by the plow or other implement. To prevent the leaves and branches from falling onto the conveyer 29, and also to strip off all parts of the vines still attached to the potatoes, there are provided a series of spaced horizontal strips 31 and a vertical plate 32 having a series of upstanding tongues 33, said strips and plate being suitably supported in the frame work of the machine. Plate 32 is arranged transversely of the machine, directly above the rear or left-hand edge of the conveyer 29, while the strips 31 are disposed longitudinally of the machine and are provided at their front ends with inwardly and downwardly projecting extensions 34 which curve around and beneath the upper front shaft 13. The rear ends of said strips are curved part-way around the upper rear shaft 14.

In order to drive conveyer 29, shaft 13 has secured to one end thereof a bevel gear 35 which meshes with a similar gear 36 secured to the upper end of a vertical transmission shaft 37 suitably journaled in brackets formed upon the front member of the side frame 1. To the lower end of this shaft there is fastened a bevel gear 38 which is in mesh with a bevel gear 39 fast on the front end of the right-hand conveyer shaft 41, said shaft being likewise supported in brackets formed upon side 1. (See Fig. 2.) Shaft 41 carries a pair of sprockets 42 connected with similar sprockets 43 on the left-hand shaft 44 at the discharge end of the conveyer by a pair of chains 45, to which chains the edges of the conveyer belt are fastened. Conveyer 30 is driven from the conveyer above described through the medium of a transmission shaft 46 carrying bevel gears 47 and 48, one of which gears meshes with a gear 49 on conveyer shaft 44, and the other with a gear 50 secured to the adjacent end of the rear shaft 51 of conveyer 30. Shaft 51 carries a roller 52 which is connected by the conveyer belt 30 with a roller 53 on the front conveyer shaft 54 said shafts 51 and 54 being supported in the sides of the conveyer frame 55. To the front end of frame 55, there is pivotally connected, as at 56, a swinging discharge chute 57.

In order to remove any leaves and other trash which may be retained by the rakes after the latter have been inverted, there is provided a rotating cleaner comprising series of oppositely-curved arms 59 secured diametrically to a base or body 60 rotatably mounted in the upper rear end of the machine frame, the arrangement of said arms being such that they will pass between the rake tines, as shown in Fig. 1. To operate said cleaner, one of the trunnions 61 with which its body is provided carries a gear 62 in mesh with the gear member 63 of a combined gear and sprocket mounted on a stub shaft 64 affixed to the adjacent side frame. The sprocket member 65 of this compound gear is connected by a chain 66 with a sprocket 67 on shaft 9.

The machine is designed to be connected to the rear of the collecting wagon above referred to by means of a yoke 68 or the like, said wagon being propelled in any suitable manner and effecting, in turn, the propulsion of the machine.

The operation of the machine as a whole is believed to be apparent from the foregoing, and further description is accordingly omitted.

I claim as my invention:

1. In a potato harvester, the combination of a frame, a pair of endless elements arranged therein in spaced parallel relation, means for driving said elements, a plurality of rakes pivoted to said elements and provided at their ends with rollers, and tracks for guiding said rakes when said elements are in motion, said tracks including each a continuous main rail along which the adjacent rollers travel conforming to the shape of said elements, and a pair of supplemental rails associated with the main rail and disposed in spaced parallel relation to the same for holding the rollers against said main rail at predetermined points.

2. In a potato harvester, the combination of a frame, a pair of endless elements arranged therein, means for driving said elements, a plurality of gathering rakes pivoted to said elements and provided with guide rollers, a discharge conveyer mounted in said frame, means for driving same, and tracks mounted on said frame and engaging said rollers for guiding said rakes during their travel and for successively inverting same on reaching a predetermined point, to discharge their contents onto said conveyer.

3. In a potato-harvester, the combination of a frame, a pair of endless elements arranged therein, means for driving said elements, a plurality of gathering implements pivoted to said elements and provided with guide rollers, a discharge conveyer mounted in said frame and running directly beneath the upper stretches of said elements, and at right angles to the same, means for driving said conveyer, a pair of continuous main rails engaging the adjacent rollers of said implements, and conforming to the shape of said elements, and supplemental rails associated with the upper portions of said main rails and likewise engaging said rollers, for inverting said implements on reaching a point above said conveyer, to dump their contents thereonto.

4. In a potato harvester, the combination of a frame, a pair of endless elements arranged therein, means for driving said elements, a plurality of gathering implements pivoted to said elements and provided with guide rollers, a discharge conveyer mounted in said frame and running directly beneath the upper stretches of said elements, and at right angles to the same, means for driving said conveyer, a pair of continuous main rails engaging the adjacent rollers of said implements, and conforming to the shape of said elements, supplemental rails associated with the lower portions of the main rails, and engaging said rollers, for holding said implements in position to gather up the potatoes during a portion of their travel, and additional supplemental rails associated with the upper portions of said main rails and likewise engaging said rollers, for inverting said implements on reaching a point above said conveyer, to dump their contents thereonto.

In testimony whereof I affix my signature in presence of two subscribing witnesses.

CHARLES MOWRY.

Witnesses:
ARTHUR E. ROWLEY,
JOHN BOHN.